May 31, 1932.   E. J. WITCHGER   1,860,640
TELESCOPING GAUGE
Filed Feb. 13, 1931

INVENTOR
EUGENE J. WITCHGER
BY George B. Willcox
ATTORNEY

Patented May 31, 1932

1,860,640

UNITED STATES PATENT OFFICE

EUGENE J. WITCHGER, OF SAGINAW, MICHIGAN, ASSIGNOR TO LUFKIN RULE CO., OF SAGINAW, MICHIGAN, A CORPORATION OF MICHIGAN

TELESCOPING GAUGE

Application filed February 13, 1931. Serial No. 515,449.

This invention pertains to telescoping gauges such as are commonly used for gauging the internal diameters of cylinders and for other uses of like nature.

Known gauges of the class to which my improvement is adapted to be applied consist of two tubes slidingly telescoped, one within the other and normally urged toward their elongated position by the action of a spring concealed within the tubes. To one of the tubes is fixed a long handle that projects from it at right angles. The handle is used to introduce the tubes into the cylinder or other work piece to be measured and is equipped with a tube-releasing and clamping device by which the telescoped tubes can be freed so they will elongate under the action of the spring and assume their work-gauging position. The clamping device then fastens the tubes together to preserve the gauged dimension.

Heretofore the handle has been fixed to the larger of the two tubes near the end into which the smaller tube entered. The disadvantage of that arrangement was that the tool was usually out of balance because the handle was always nearer one end of the telescoping unit, except when the gauge was fully extended. This brought the weight of both tubes on one side of the handle and threw the tool out of balance, rendering the "feel" of the instrument unreliable.

In my invention the old combination of telescoping tubes, spring and handle is reorganized in such manner that the tool will be kept automatically in substantial balance not only when it is fully extended, but also when it is partly or completely telescoped.

This invention, therefore, is characterized by having its handle slidable lengthwise of the outer tube, instead of being fastened to an end of it as heretofore, and by the further provision of novel means whereby the handle is caused to shift along the outer tube and stop when it has positioned itself at midlength of the gauge.

A further object of the invention is to provide in the handle an improved screw-actuated tube clamping device with its parts so arranged that if the screw is inadvertently removed from the handle the latter with the two telescoping tubes and the spring will remain assembled, whereas in the prior constructions above referred to, if the clamping screw and its rod happened to be withdrawn from the handle the tubes and spring would fly apart.

With the foregoing and certain other objects in view, which will appear later in the specification, my invention comprises the devices described and claimed and the equivalents thereof.

In the drawings, Fig. 1 is a longitudinal sectional view of the telescopic tubes and handle hub of a gauge embodying my improvement in its automatically self-centering form.

Figure 3:
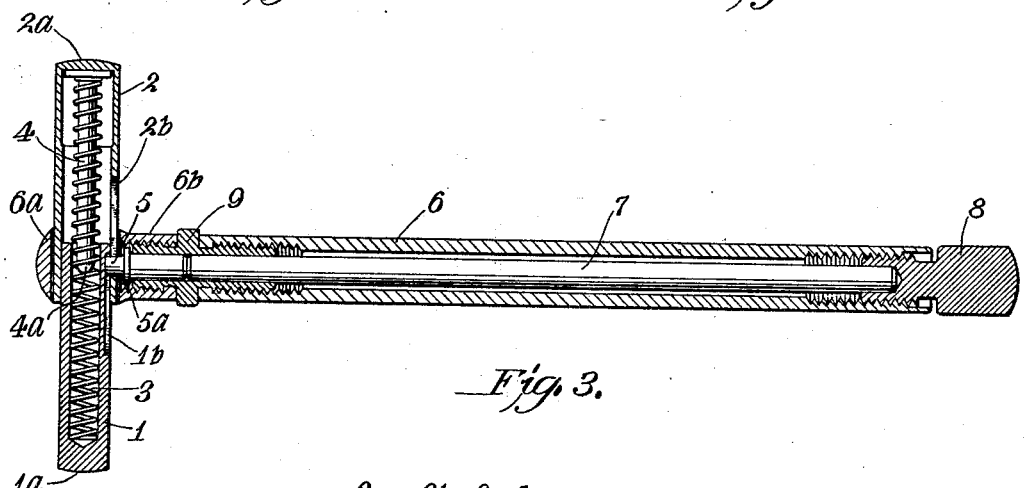
Fig. 3 is a longitudinal section of the complete gauge embodying an approximately self-centering form of the invention, wherein the automatic self-centering action of the handle is present when the tubes are completely extended or completely retracted but is not present for intermediate positions of the tubes, although the user can center it manually whenever he desires to do so.
Figure 4:
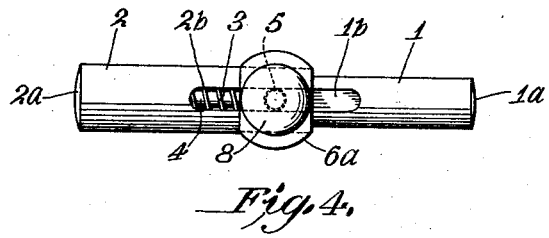
Fig. 4 is an end view of the parts shown in Fig. 3 fully extended.

I will first describe the form shown in Fig. 3, wherein the handle is self-centering when fully extended, and also when completely retracted, but is not automatically self-centering for intermediate positions. On account of its compactness the form of Fig. 3 is considered preferable for some uses over the form of Fig. 1 which is self-centering for all adjustments of the gauge.

Within the telescopic tubes 1, 2 is a helical compression spring 3 normally urging the gauge ends 1a and 2a apart. A central rod 4 may be fixed axially in tube 2, as by brazing its end to the gauge end 2a, to project into tube 1 and serve as a guide for the spring. The free end 4a of rod 4 is rounded. Hub 6a of handle 6 is slidable lengthwise along the outer tube 2.

Figure 5:
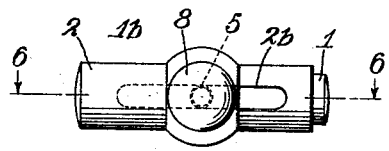
Fig. 5 is a similar view, retracted.
Figure 6:
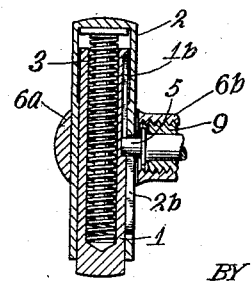
Fig. 6 is a section on line 6—6 of Fig. 5, the handle broken away.

The end of groove 1b and the end of slot 2b co-act with a pin 5 to automatically locate the handle 6 midway between the working ends 1a and 2a of the gauge whenever the gauge is fully extended, as shown in Figs. 1, 2, 3 and 4. The opposite ends of the same slots automatically position the handle midway between those ends when the tubes are completely telescoped, as shown in Figs. 5 and 6. In these two extreme positions, therefore, the handle is automatically self-centering the gauge is sufficiently well balanced.

However, at any intermediate position of tubes 1, 2 the handle is not automatically self-centering, but the operator can easily slide the handle lengthwise along the overlapping positions of groove 1b and slot 2b to approximately mid-position if he desires to do so. Hence in the form illustrated in Figs. 3 and 6 it is always possible to so adjust the handle on the outer tube as to put the tool into correct balance when measurements are taken.

The push pin 5, concealed within the hub 6a and the shank 6b, projects freely through a longitudinal slot 2b formed in tube 2 and into a shallow groove 1b formed in tube 1, as shown.

To lock tubes 1 and 2 together in any more or less telescoped position the end of pin 5 is forced against the bottom wall of groove 1b by means of a rod 7 and a knurled clamping screw 8 threaded to the outer end of handle 6.

Pin 5 can not get out accidentally and permit the tubes and spring to scatter even though nut 8, rod 7 and handle 6 be removed, because those parts are kept together by a tubular gland 9 made with threaded ends screwed respectively into the internally threaded end of handle 6 and into the internally threaded shank 6b of hub 6a, as shown in Fig. 3. An abutment member 5a is formed on pin 5, preferably an enlarged shoulder or collar that takes against the inner end of the threaded gland 9.

Pin 5 serves the double purpose of guiding the longitudinal movement of the tubes with respect to each other and of establishing inner and outer limits of tube movement. It also clamps the hub 6a of the handle rigidly to both tubes when the knurled nut 8 is turned in the tightening direction. Upon unscrewing the nut, pin 5 releases its frictional grip on the bottom of groove 1b. The handle can then be slid by hand along the tubes into balanced relation to them.

Measuring, say, the internal diameter of an engine cylinder is done as follows:

The tubes are first fully telescoped against the compression of the spring and are clamped by nut 8. Handle 6 is then midway the length of the tubes, as shown in Figs. 5 and 6.

The tool is then lowered into the cylinder to be gauged and the nut 8 is loosened. Spring 3 thereupon projects the tubes outwardly and their ends 1a, 2a contact the opposite walls of the cylinder. If hub 6a of handle 6 is not sufficiently near the middle of the cylinder to suit the operator's sense of balance while he is exploring to place the tubes on the spots between which the measurement is intended to be taken he shifts the handle along the tubes to the desired position, the hub 6a being free to slide somewhat along the overlapping middle parts of slot 2b and groove 1b. When the hub has been moved by hand to the desired approximate mid-position it is clamped by nut 8, rod 7 and pin 5 and the tool is thereupon set as to its length and is withdrawn from the bore.

Figures 1, 2:
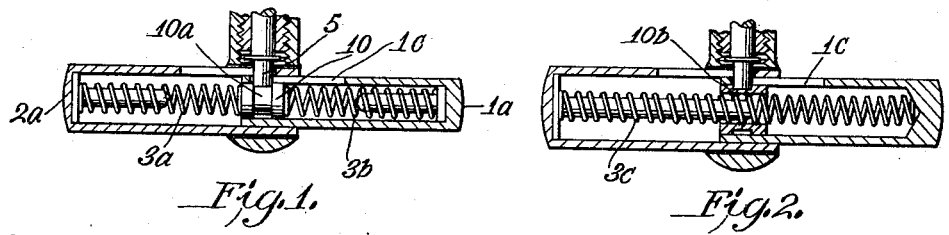
Fig. 2 is a modified form of the structure shown in Fig. 1.

Referring now to the form shown in Fig. 1, which is automatically self-centering, spring 3 is made in two parts, 3a and 3b, their ends abutting against a slidable spool 10 formed with a groove 10a to receive the end of push pin 5. The groove 1b is dispensed with and instead a slot 1c is formed in the inner tube 1a. The springs 3a and 3b automatically position spool 10, pin 5 and handle 6 in the middle of the gauge, always keeping it in substantial balance, regardless of the amount of extension or retraction of the gauge. The push pin clamps the spool, tubes and hub together.

In the further modified form shown in Fig. 2, instead of employing two springs as in the example just given, one spring, 3c, is used, the spool 10 being secured by soldering or otherwise at 10b to the middle of the spring. The self-centering spring action is the same as in the form shown in Fig. 1.

In both forms above described the telescopic tubes are always kept in at least approximate balance on the handle. In the forms shown in Figs. 3 to 6 such self-centering is done semi-automatically and in the form of Figs. 1 and 2 it is entirely automatic. Both embodiments accomplish the object of attaining a proper hang or balance of the tubes on the handle, consequently improving the convenience of operation of the tool, especially when it is used for measuring internal diameters at places far within a workpiece, as for example, an engine cylinder.

By making the hub 6a of handle 6 slidable along the outer tube, instead of fastening it thereto, so as to make it immovable while the tool is being used, as has been done in known devices of the prior art, I have imparted to a telescopic gauge the herein described capacity for self-centering and self-balancing, either in a manner that is automatic, or manual, as set forth.

The work-engaging faces 1a, 2a having been spread by the spring into gauging contact with the work, the slidable hub and its associated clamping devices make possible all of the advantages of centering and balancing above set forth. Hence it follows that the invention in its broad aspect is not limited to telescopic members of the specific tubular shape shown. Those members may be in the form of semi-circular bars laid face to face, or of two tongued-and-grooved bars, or any equivalent shape without departing from my invention as set forth in certain of the claims.

Having thus described my invention, what I claim and desire to secure by Letters Patent is:

1. A gauge comprising telescoping tubes normally spring-actuated outwardly, the inner tube presenting an external longitudinal groove, the outer tube having a slot registering with said groove, an apertured hub slidable on said outer tube, a hollow handle, a gland threaded to the handle and hub, a push-pin slidably received in said gland and having a shoulder for engagement with the gland, and a rod in the handle arranged to abut against an end of the push pin, said rod having a clamping screw threaded to the handle.

2. A gauge comprising telescoping tubes normally spring-actuated outwardly, the inner tube presenting an external longitudinal groove, the outer tube having a slot registering with said groove, an apertured hub slidable on said outer tube, a hollow handle for said hub, a gland secured within the handle and detachably secured to the hub, a push pin slidingly received in said gland, an abutment member on said pin for engagement with the gland, a rod in the handle arranged to abut against an end of the push pin and means for pressing the rod endwise against the pin.

3. A gauge comprising telescoping tubes normally spring-actuated toward their extended position, the inner tube presenting an external longitudinal groove, the outer tube having a slot registering with said groove, an apertured hub slidable on said outer tube, a shank for said hub including a push pin mounted for endwise movement, an end of said pin projecting through the slot of the outer tube into the said groove of the inner tube, and push-pin actuating means associated with the handle and arranged to forcibly press the pin against the inner tube at the bottom of said groove.

4. A gauge comprising telescoping tubes, a spring therein normally urging said tubes toward their extended position, said tubes formed with overlapping slots disposed lengthwise thereof, a spool engaging said spring and slidable within said tubes, an apertured hub slidable on said outer tube, a handle for said hub, a push pin mounted for endwise movement in said hub and having an end projecting through said slots and engaging said spool, and push-pin actuating means associated with the handle and arranged to forcibly press the spool and tubes into mutually clamping relation.

5. A gauge comprising telescoping tubes, a spring therein normally urging said tubes toward their extended position, a spool engaging said spring and slidable within said tubes, an apertured hub slidable on said outer tube, a handle for said hub, a push pin mounted for endwise movement in said hub and having an end engaging said spool, and push-pin actuating means associated with the handle and arranged to forcibly press the spool and tubes into mutually clamping relation.

6. In a gauge including work-engaging members telescopically arranged in respect to each other and normally spring-actuated toward their extended position, a slidable member movable lengthwise of said work-engaging members, fastening means mounted on said slidable member and adapted to hold said work-engaging members and said slidable member together in releasable mutually clamping relation at any predetermined telescopically adjusted position of the work-engaging members, for the purpose set forth.

7. In a gauge including outer and inner telescoping tubes normally spring-actuated toward their extended position, a hub member slidable upon the outer tube lengthwise thereof, a handle for said hub member, and fastening means carried by said slidable hub member, adapted to hold said hub and tubes together, in releasable mutually clamping relation at any predetermined telescopically adjusted position of the tubes.

In testimony whereof, I affix my signature.

EUGENE J. WITCHGER.